US008279374B2

(12) United States Patent
Park et al.

(10) Patent No.: US 8,279,374 B2
(45) Date of Patent: Oct. 2, 2012

(54) FLUORESCENT MICROSCOPE HAVING STAGE, OBJECTIVE LENS, LIGHT SOURCE, IMAGE SENSOR, DISPLAY UNIT, CONTROLLER, AND WIRELESS TRANSCEIVER PROVIDED IN ONE BODY, AND REMOTE CONTROL SYSTEM THEREOF

(75) Inventors: Hwa Joon Park, Seoul (KR); Jeoung Ku Hwang, Seoul (KR); Chan Il Chung, Seoul (KR); Cha Hee Kim, Anyang-si (KR); Min Sung Kim, Hwaseong-si (KR)

(73) Assignee: Nanoentek, Inc., Seoul (KR)

( * ) Notice: Subject to any disclaimer, the term of this patent is extended or adjusted under 35 U.S.C. 154(b) by 240 days.

(21) Appl. No.: 12/780,031

(22) Filed: May 14, 2010

(65) Prior Publication Data
US 2011/0085031 A1    Apr. 14, 2011

(30) Foreign Application Priority Data

Oct. 14, 2009  (KR) .................. 10-2009-0097893

(51) Int. Cl.
*H04N 7/18* (2006.01)
*H04N 5/243* (2006.01)
*H04N 9/47* (2006.01)

(52) U.S. Cl. ............ 349/79; 348/80; 382/128; 382/276; 359/385; 359/386; 359/387; 359/388; 359/389; 359/390

(58) Field of Classification Search .................. 348/79, 348/80; 382/128, 276; 359/385–390
See application file for complete search history.

(56) References Cited

U.S. PATENT DOCUMENTS

| | | | | |
|---|---|---|---|---|
| 6,140,644 A * | 10/2000 | Kawanami et al. | ........... | 250/310 |
| 6,274,876 B1 * | 8/2001 | Kawanami et al. | ...... | 250/492.22 |
| 6,661,571 B1 * | 12/2003 | Shioda et al. | ................. | 359/372 |
| 6,917,377 B2 * | 7/2005 | Aizaki et al. | .................... | 348/79 |
| 7,873,193 B2 * | 1/2011 | De La Torre-Bueno et al. | ............. | 382/128 |
| 8,116,543 B2 * | 2/2012 | Perz et al. | ..................... | 382/128 |
| 2003/0016301 A1 * | 1/2003 | Aizaki et al. | ................. | 348/345 |
| 2004/0070822 A1 * | 4/2004 | Shioda et al. | ................. | 359/372 |
| 2004/0233317 A1 * | 11/2004 | Matsushita | ............. | 348/333.02 |
| 2005/0282268 A1 * | 12/2005 | Kagayama | ................ | 435/288.7 |
| 2007/0031043 A1 * | 2/2007 | Perz et al. | ..................... | 382/225 |
| 2007/0280517 A1 * | 12/2007 | De La Torre-Bueno et al. | ............. | 382/128 |
| 2007/0291111 A1 * | 12/2007 | Ladha | ............................ | 348/80 |
| 2007/0293893 A1 * | 12/2007 | Stolen et al. | ..................... | 607/2 |

(Continued)

FOREIGN PATENT DOCUMENTS

EP    0908751 A2    4/1999
(Continued)

OTHER PUBLICATIONS

European Search Report for European Patent Application No. 10162173.8, pp. 1-7.

*Primary Examiner* — Haresh N Patel
(74) *Attorney, Agent, or Firm* — Sherr & Jiang, PLLC

(57) ABSTRACT

The present invention relates to a fluorescent microscope and a remote control system thereof. The present invention reduces the size of the fluorescent microscope to facilitate transportation and management and be disposed in a narrow place such as the inside of the incubator or the clean bench, etc. and observes the samples through a remote control, thereby making it possible to improve the user convenience.

6 Claims, 5 Drawing Sheets

U.S. PATENT DOCUMENTS

| | | | |
|---|---|---|---|
| 2008/0155452 A1* | 6/2008 | Mizusawa | 715/772 |
| 2008/0176332 A1 | 7/2008 | Berns et al. | |
| 2008/0204551 A1* | 8/2008 | O'Connell et al. | 348/79 |
| 2008/0305515 A1* | 12/2008 | Burgart et al. | 435/40.52 |
| 2009/0086314 A1 | 4/2009 | Namba et al. | |
| 2009/0097108 A1* | 4/2009 | Fox et al. | 359/385 |
| 2010/0033812 A1* | 2/2010 | Fomitchov et al. | 359/383 |
| 2010/0040266 A1* | 2/2010 | Perz et al. | 382/128 |
| 2010/0067103 A1* | 3/2010 | Sangu | 359/385 |

FOREIGN PATENT DOCUMENTS

| | | |
|---|---|---|
| EP | 1329757 A1 | 7/2003 |
| EP | 1384972 A1 | 1/2004 |
| EP | 1533644 A1 | 5/2005 |
| EP | 1598689 A2 | 11/2005 |
| JP | 3047831 U | 2/1998 |
| WO | 2006/050355 A2 | 5/2006 |
| WO | WO2007/139201 | 12/2007 |

* cited by examiner

FLUORESCENT MICROSCOPE HAVING STAGE, OBJECTIVE LENS, LIGHT SOURCE, IMAGE SENSOR, DISPLAY UNIT, CONTROLLER, AND WIRELESS TRANSCEIVER PROVIDED IN ONE BODY, AND REMOTE CONTROL SYSTEM THEREOF

BACKGROUND OF THE INVENTION

1. Field of the Invention

The present invention relates to a fluorescent microscope and a remote control system thereof, and more particularly, to a fluorescent microscope and a remote control system thereof with improved user convenience by facilitating transportation and management and being disposed in a narrow place such as the inside of an incubator or a clean bench, etc. due to the reduction in size and observing samples through a remote control.

2. Description of the Related Art

Generally, the fluorescent microscope uses a principle that emits fluorescence when phosphor absorbs light having a specific wavelength and means an apparatus that coats fluorescent materials (fluorescent pigments) on samples and then irradiates light having absorption wavelengths of the fluorescent materials to the samples to observe the samples through the fluorescent materials emitting light.

The fluorescent microscope has been mainly used to detect biological materials and can be suitably used for samples such as bacteria or protein having self-fluorescence or samples capable of adsorbing the fluorescent materials and selects a proper fluorescent pigment according to each sample. As encapsulant for the samples, liquid paraffin, water, glycerol, etc. not having self-fluorescence have been mainly used instead of balsam.

Since the existing fluorescent microscope is very expensive and as has a large size, it is not easy to dispose the fluorescent microscope in a narrow place or transport it. In particular, since a light source unit or a display, etc. used for the fluorescent microscope are separately provided from a main body, the management is not easy.

In addition, although it is effective to observe the samples by disposing the fluorescent microscope in an incubator culturing cells or a clean bench providing an aseptic environment in consideration of the biological study where the fluorescent microscope is mainly used, it is impossible to dispose the fluorescent microscope in the incubator or the clean bench due to the foregoing problem of size. Therefore, a need exists for a fluorescent microscope having a compact size.

Further, since most targets to be observed by the fluorescent microscope should be observed for a long time, a development of a system capable of executing an image focus control, an intensity control of a light source, a control of an observation period, etc., by remote even when the user leaves a study room is needed.

SUMMARY OF THE INVENTION

The present invention is to provide a fluorescent microscope and a remote control system thereof capable with improved user convenience by facilitating transportation and management and being disposed in a narrow place such as the inside of an incubator or a clean bench, etc., due to the reduction in size and observing samples through a remote control.

According to an embodiment of the present invention, a fluorescent microscope includes: an objective lens that forms images of fine objects treated with fluorescent materials on a stage; a light source unit that irradiates to the fine objects; an image sensor that provides light matching coloring wavelengths of the fluorescent materials passing through the objective lens and converts the provided light into electrical signals; a display unit that receives the electrical signals from the image sensor and outputs them as images; a controller that controls a focus and a storing period of the images according to commands input by a user; and a wireless transmitter/receiver that can wirelessly transmit the images to the outside and can wirelessly receive commands input to the controller, wherein the stage, the objective lens, the light source unit, the image sensor, the display unit, the controller, and the wireless transmitter/receiver are integrally provided in one body.

The fluorescent microscope according to the present invention may be remotely control led by an external controller that can wirelessly communicate with the wireless transmitter/receiver.

The controller can capture the images of the fine objects per a predetermined period set by the user and store them in a storage device.

Meanwhile, the fluorescent microscope further includes a cover part that prevents light from the outside except for light irradiated from the light source unit from inputting to the objective lens.

The objective lens may include a heating line part that suppresses and removes moisture generated from the surface of the lens, wherein the heating line part may be configured to be automatically operated under predetermined temperature and predetermined humidity.

According to another embodiment of the present invention, a remote control system includes: a fluorescent microscope that includes an objective lens forming images of fine objects treated with fluorescent materials on a stage, a light source unit irradiating to the fine objects, an image sensor providing light matching coloring wavelengths of the fluorescent materials passing through the objective lens and converting the provided light into electrical signals, a display unit receiving the electrical signals from the image sensor and outputting them as images, a controller controlling a focus and a storing period of the images according to commands input by a user, and a wireless transmitter/receiver capable of wirelessly transmitting the images to the outside and wirelessly receiving commands input to the controller, wherein the stage, the objective lens, the light source unit, the image sensor, the display unit, the controller, and the wireless transmitter/receiver are integrally provided in one body; a main server that can wirelessly communicate with the wireless transmitter/receiver; and a client terminal that is connected to the main server, receives the images transmitted from the wireless transmitter/receiver through the main server and outputs them to be observed by the user, and transmits commands input by the user to the wireless transmitter/receiver through the main server.

The user may control the focus of the images output from the fluorescent microscope through the client terminal, control light intensity of the light source unit, and capture the images of the fine objects and set a period storing them in a storage device.

The user may operate a heating line part to suppress and remove moisture through the client terminal.

The present invention has the following effects.

First, the stage, the objective lens, the light source unit, the image sensor, the display unit, the controller, and the wireless transmitter/receiver, etc., that configure the fluorescent microscope is integrally provided in one body, thereby making it possible to configure the fluorescent microscope in a compact size and easily and effectively transport and manage the fluorescent microscope.

Second, the fluorescent microscope is implemented in a compact size to be disposed in a narrow space such as the inside of the incubator or the clean bench, etc., thereby making it possible to culture the cells and effectively observe the samples.

Third, the change in experimental environment and the samples such as the image focus control, the intensity control of the light source, the control of the observation period, etc., can be observed by remote even when the user leaves a study room, thereby improving the user convenience.

DETAILED DESCRIPTION OF THE PREFERRED EMBODIMENTS

Figure 1:
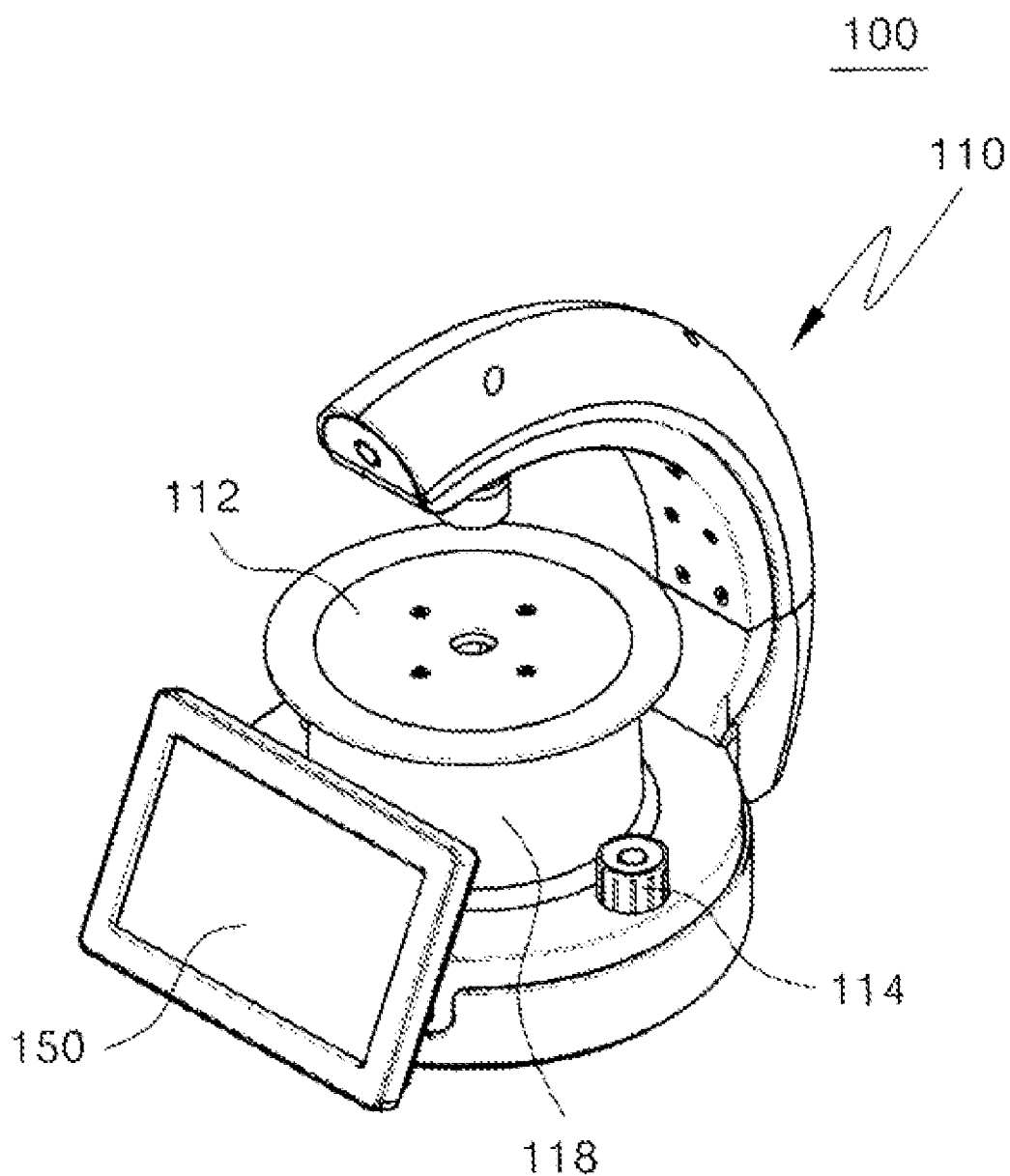
FIG. 1 is a perspective view of a fluorescent microscope according to the present invention.

Hereinafter, exemplary embodiments of the present invention will be described in detail with reference to the accompanying drawings. However, the present invention is not be limited to the embodiments set forth herein and therefore, may be modified in many different forms. Rather, the exemplary embodiments set forth herein are provided to a person of ordinary skilled in the art to thoroughly and completely understand contents disclosed herein and fully provide the spirit of the present invention. Like reference numerals designate like components throughout the specification.

Figure 2:
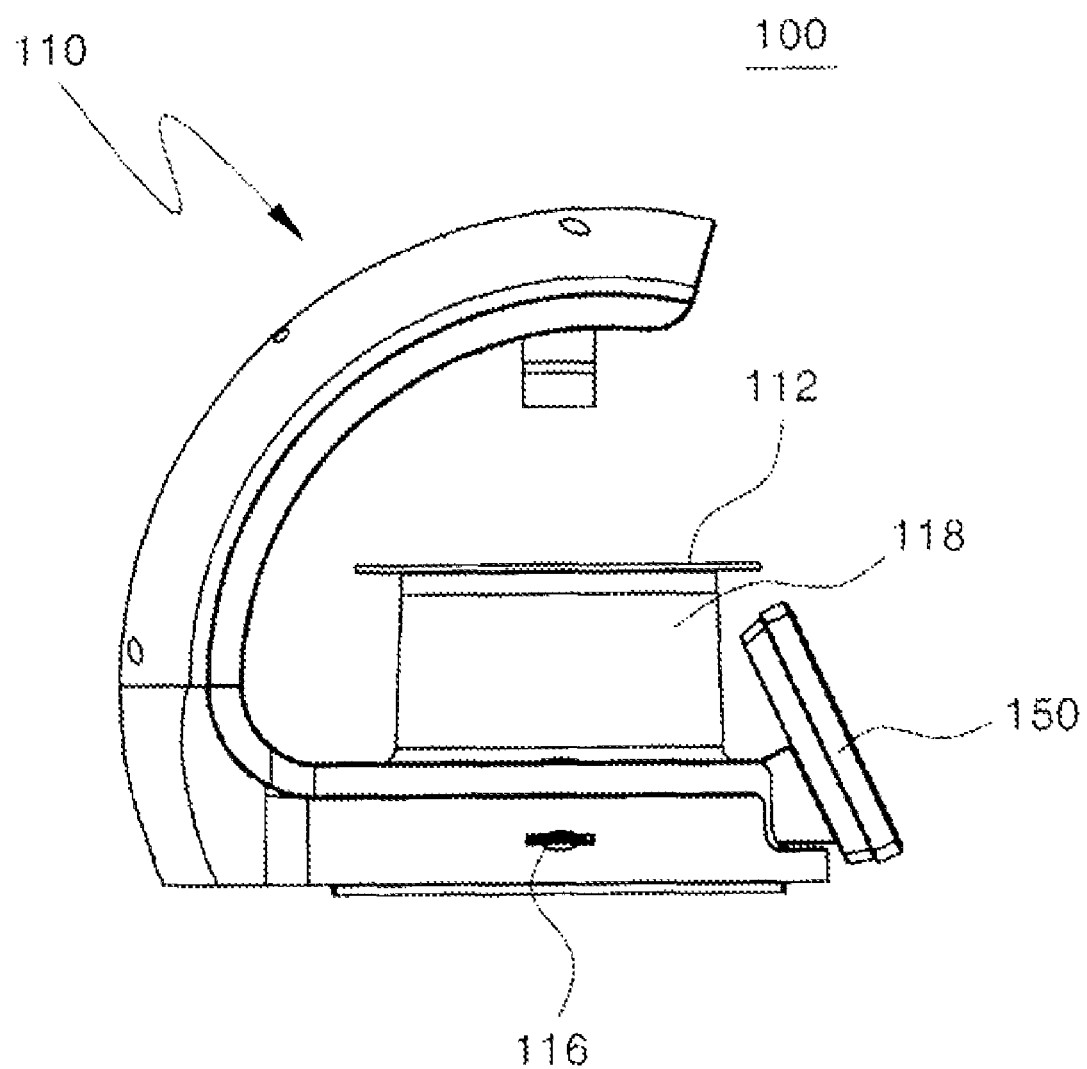
FIG. 2 is a side view of the fluorescent microscope according to the present invention.
Figure 3:
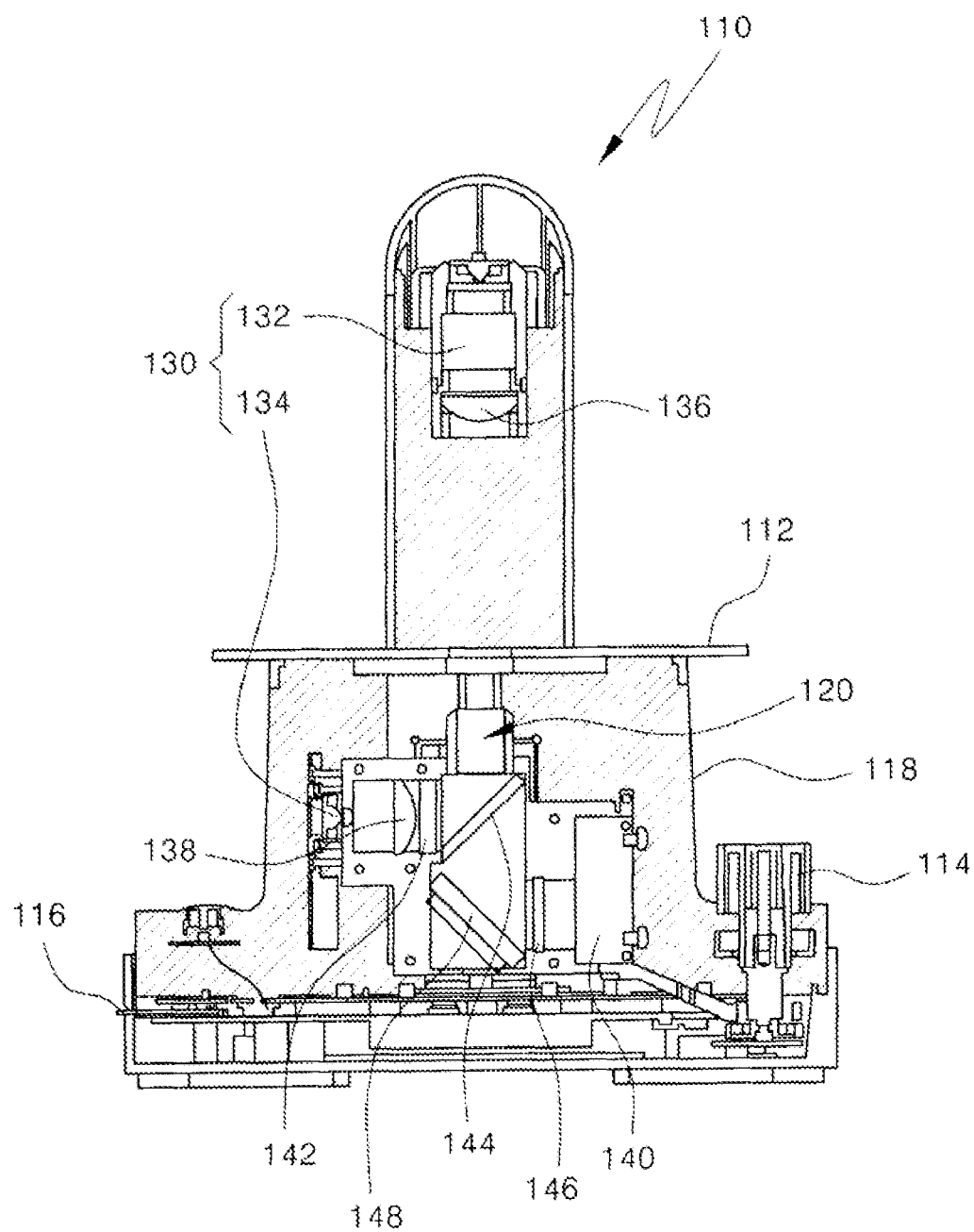
FIG. 3 is an inner configuration view of the fluorescent microscope according to the present invention.
Figure 4:
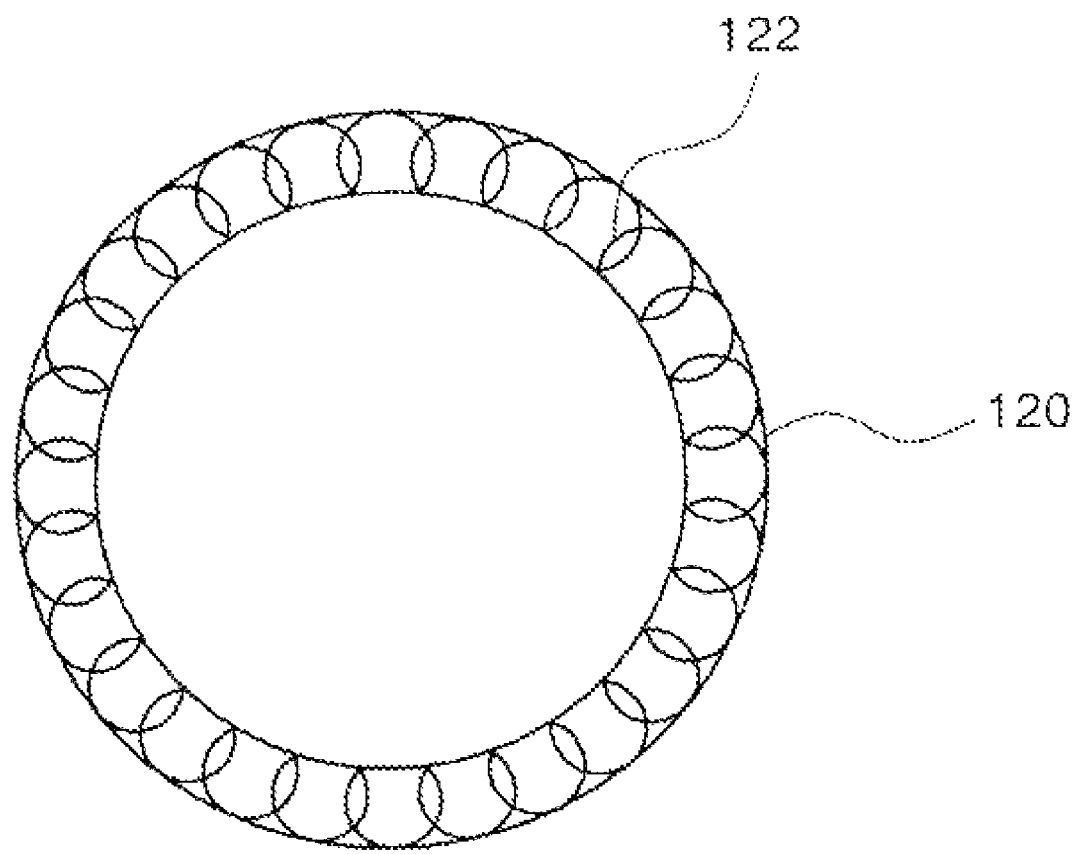
FIG. 4 is a top plan view of a heating line part installed in an objective lens of the fluorescent microscope according to the present invention.
Figure 5:
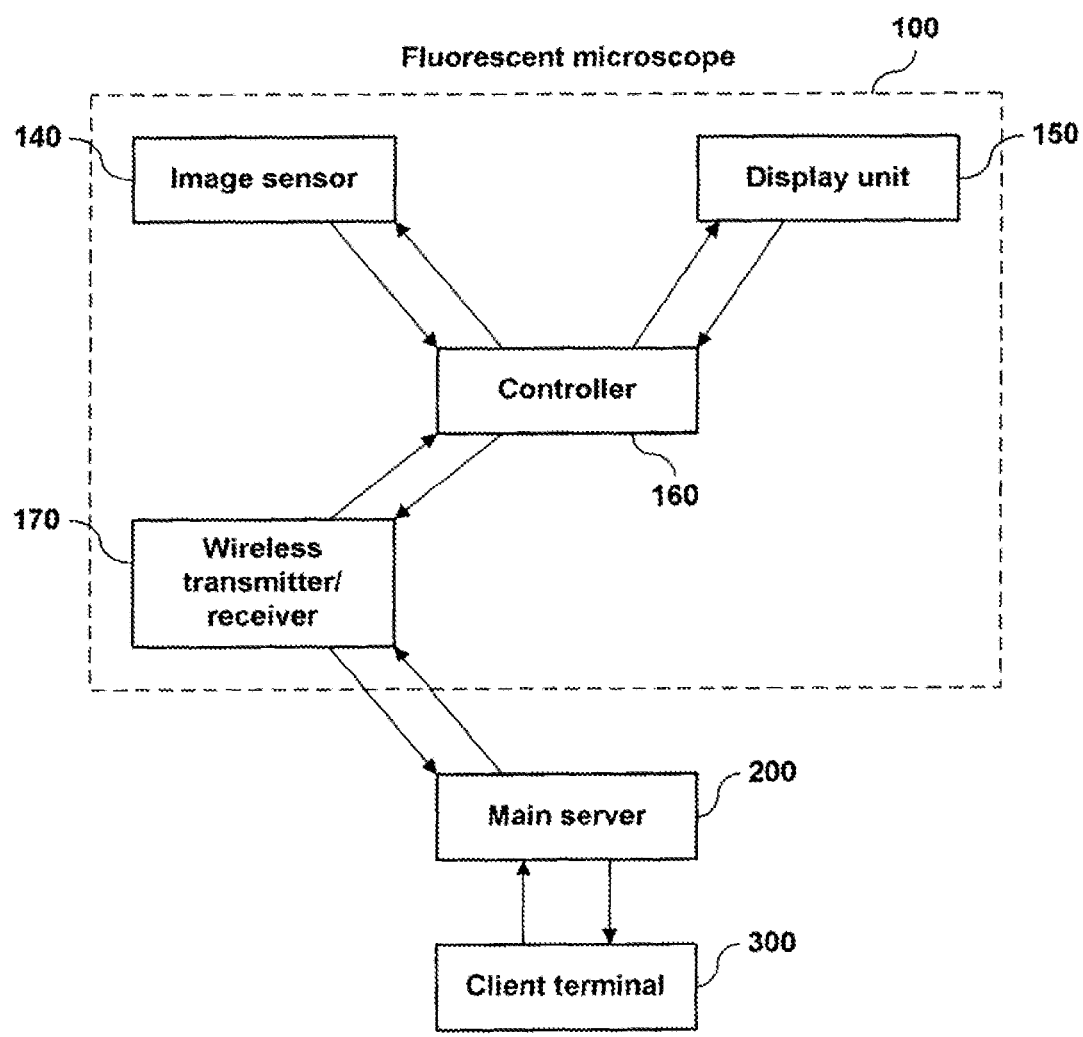
FIG. 5 is a block diagram showing a configuration of a remote control system of the fluorescent microscope according to the present invention.

FIG. 1 is a perspective view of a fluorescent microscope according to the present invention, FIG. 2 is a side view of the fluorescent microscope according to the present invention, and FIG. 3 is an inner configuration diagram of the fluorescent microscope according to the present invention. FIG. 4 is a top plan view of a heating line part installed in an objective lens of the fluorescent microscope according to the present invention.

FIGS. 1 to 5, a fluorescent microscope 100 according to the present invention is configured to largely include an objective lens 120 that forms images of fine objects treated with fluorescent materials on a stage 112; a light source unit 130 that irradiates to the fine objects; an image sensor 140 that provides light matching coloring wavelengths of the fluorescent materials passing through the objective lens 120 and converts the provided light into electrical signals; a display unit 150 that receives the electrical signals from the image sensor 140 and outputs them as images; a controller 160 that controls a focus and a storing period of the images according to commands input by a user; and a wireless transmitter/receiver 170 that can wirelessly transmit the images to the outside and can wirelessly receive commands input to the controller 160.

The stage 112 may be positioned at a central portion of a body 110 of the fluorescent microscope 100. The stage 112 is formed in a flat form having a predetermined area so that the samples including the fine objects to be observed can be disposed.

The objective lens 120 is disposed on the bottom portion of the stage 112, wherein a surface corresponding to the objective lens 120 of the stage 112 may be provided with circular holes to form the images of the fine objects treated with the fluorescent materials.

Meanwhile, the light source part 130 irradiating light to the fine objects is provided, wherein the light source part 130 may be configured to include a first light source unit 132 that irradiates light to the top portion of the objective lens 120 and a second light source unit 134 that vertically irradiates light to an optical path irradiated from the first light source unit 132.

In the exemplary embodiment, an light emitting diode (LED) can be used as the first light source unit 132 and the second light source unit 134. More specifically, IT is preferable that the first light source unit 132 is configured of a white LED and the second light source unit 134 is configured of a blue LED.

Light irradiated from the first light source unit 132 passes through the samples disposed on the stage 112 and is incident to the objective lens 120, which is then passes through a dichroic filter 144 and light irradiated from the second light source unit 134 passes through an excitation filter 142 and reaches the dichroic filter 144.

At this time, the front portions of the optical paths of the first light source unit 132 and the second light source unit 134 may be provided with a first focal lens 136 and a second focal lens 138 in order to control a focus of light incident to the dichoric filter 144.

Meanwhile, the dichroic filter 144 selects and passes through light matching coloring wavelengths of the fluorescent materials included in the samples. The light reaches the image sensor 140 via a reflecting mirror 148 and an emission filter 146.

The light reaching the image sensor 140 is converted into electrical signals in the image sensor 140. The electrical signals are transmitted to the display unit 150 and output as images that can be confirmed with the user's eye.

Further, the fluorescent microscope 100 according to the present invention includes a controller 160 that can control the overall functions of the fluorescent microscope. The controller 160 may consist of a micro-processor, which controls the focus and storage period of the images, the intensity of the light source, etc. according to commands input by the user.

In particular, in the fluorescent microscope 100 according to the present invention, the controller 160 captures the images of the fine objects per a predetermined period set by the user and stores them in the storage device, thereby making it possible to implement a time lapse function.

Further, the fluorescent microscope 100 according to the present invention may be configured to include a wireless transmitter/receiver 170 that can wirelessly transmit the captured images to the outside and wirelessly receive commands input to the controller 160.

Therefore, the fluorescent microscope 100 can be remotely controlled by an external controller that can wirelessly communicate with the wireless transmitter/receiver 170 and thus, the user can perform the focus and storage period of the images, the intensity of the light source, etc. For example, the external controller may be a remote controller that can be simply operated and may be configured to be used within a predetermined radius of the fluorescent microscope 100.

At this time, an example of a wireless communication scheme may include a radio frequency (RF) scheme, a bluetooth scheme, a WI-FI, a CDMA, etc.

In the fluorescent microscope 100 according to the present invention, it is preferable that the stage 112, the objective lens 120, the light source unit 130, the image sensor 190, the display unit 150, the controller 160, and the wireless transmitter/receiver 171 is integrally provided in one body 110.

In other words, since the light source unit 130, the lens, the display unit 150, etc. are not separately provided and integrally provided in one body 110, it is possible to configure the fluorescent microscope in a compact size due to the overall reduction in size. Further, the size of the fluorescent microscope 100 is reduced, such that the fluorescent microscope 100 can be easily transported and disposed and efficiently managed.

In addition, the fluorescent microscope is implemented in a compact size to be disposed in a narrow space such as the inside of the incubator or the clean bench, etc., thereby making it possible to culture the cells and effectively observe the samples.

At this time, one side of the body 110 is provided with a focal control unit 114, thereby making it possible to directly control an image focus by the user. On the other hand, the other side of the body 110 is provided with the external storage device 116 such as a flash memory, etc., which can be used to store the images, etc.

Meanwhile, the fluorescent microscope 100 according to the present invention may further include a cover part 118 that prevents light from the outside except for light irradiated from the light source unit from inputting to the objective lens 120.

The cover part 118 serves as a housing that covers the objective lens 120 together with the stage 112. Thereby, the cover part is disposed on the stage 112, which cannot interrupt a hole through which light incident from the first light source 132 passes, but can interrupt a path through which light from the outside can access the objective lens 120.

In this configuration, the path through which light from the outside can access the objective lens 120 is interrupted, thereby making it possible to provide an environment such a dark room around the objective lens 120 and prevent noise from generating in the images.

Further, the fluorescent microscope 100 reduces the interference of light from the outside, thereby making it possible to relatively reduce the focal distance of the objective lens 120 and does not need a light shielding film or a dark room, thereby making it possible to more reduce the overall size of the fluorescent microscope 100.

Meanwhile, the objective lens 120 may include a heating line part 122 that suppresses and removes moisture generated on the surface of the lens. More specifically, as shown in FIG. 4, the heating line part may be provided between the frames of the objective lens 120 along a circumferential direction but is not limited thereto.

As described above, since the fluorescent microscope 100 according to the present invention has a compact size, it is disposed in the incubator to be used in a cell culturing environment. However, moisture can be generated in the objective lens 120 due to high temperature and humidity in the incubator. The moisture hinders the experimental observation as well as affects the electronic products mounted in the fluorescent microscope 100, thereby making it possible to cause the malfunction or damage of the electronic products.

Therefore, the heating line part 122 may be configured to perform a function of preventing moisture from generating in the objective lens 120 and to be automatically operate under a predetermined temperature and a predetermined humidity.

According to another embodiment of the present invention, a remote control system of the fluorescent microscope may be configured to include a main server 200 and a client terminal 300 that is connected to the main server 200, receives the images transmitted from the wireless transmitter/receiver through the main server and outputs them to be observed by the user, and transmits commands input by the user to the wireless transmitter/receiver 170 through the main server 200.

The main server 200 is positioned near the fluorescent microscope 100 and is configured to transmit and wirelessly communicate with the wireless transmitter/receiver 170 by a radio frequency (RF) scheme, a bluetooth scheme, a WI-FI, a CDMA, etc.

The client terminal 300 may be connected to the main server 200 by Internet. The user can remotely transmit and receive data to and from the fluorescent microscope 100 through the client terminal 300 connected by Internet. In other words, the user can confirm the progress of the experiment in real time through the images transmitted from the wireless transmitter/receiver 170 and can remotely perform countermeasures according to the progress of the experiment.

In detail, the user can control the focus of the images output from the fluorescent microscope 100 through the client terminal, control the light intensity of the light source unit 130. Further, the user can capture the images of the fine objects to set a period stored in the storage device, thereby making it possible to change details of a time lapse function or newly set it by setting the period.

Further, the fluorescent microscope can be configured so that the user operates the heating line part 122 to suppress and remove moisture generated on the surface of the objective lens 120 through the client terminal 300.

As described above, the user confirms the progress of the experiment and remotely performs countermeasures according to the progress of the experiment even when he/she leaves the study room, thereby improving the user convenience in the experiment requiring the observation for a long time.

Although the exemplary embodiments of the present invention were described, a person of ordinary skilled in the art can variously modify and change the present invention without departing from the spirit and scope of the present invention described in the following claims. Accordingly, if the modified embodiments include components defined in claims of the present invention, it is to be construed that they are covered by the technical scope of the present invention.

The present invention relates to a fluorescent microscope and a remote control system thereof, which can be used in the production field of the fluorescent microscope and a field of study and observation using the fluorescent microscope In more detail, the present invention reduces the size of the fluorescent microscope to facilitate transportation and management and be disposed in a narrow place such as the inside of the incubator or the clean bench, etc. and observes the samples through a remote control, thereby making it possible to improve the user convenience.

What is claimed is:

1. A remote control system comprising:
   a fluorescent microscope that includes an objective lens forming images of fine objects treated with fluorescent materials on a stage, a light source unit irradiating to the fine objects, an image sensor providing light matching coloring wavelengths of the fluorescent materials passing through the objective lens and converting the provided light into electrical signals, a display unit receiving the electrical signals from the image sensor and outputting them as images, a controller controlling a focus and a storing period of the images according to commands input by a user, and a wireless transceiver capable of wirelessly transmitting the images to the outside and wirelessly receiving commands input to the controller, the stage, the objective lens, the light source unit, the image sensor, the display unit, the controller, and the wireless transceiver being integrally provided in one body;

a main server that wirelessly communicates with the wireless transceiver; and a client terminal that is connected to the main server, receives the images transmitted from the wireless transceiver through the main server and outputs them to be observed by the user, and transmits commands input by the user to the wireless transceiver through the main server, wherein the user controls the focus of the images output from the fluorescent microscope through the client terminal, wherein the user controls light intensity of the light source unit through the client terminal, wherein the user captures the images of the fine objects and sets a period storing them in a storage device, wherein the objective lens includes a heating line that suppresses and removes moisture generated from the surface of the objective lens, wherein the user operates a heating line to suppress and remove moisture through the client terminal, wherein the heating line is automatically operated under predetermined temperature and predetermined humidity, wherein the heating line is provided between frames of the objective lens along a circumferential direction of the objective lens.

2. The remote control system according to claim 1, further comprising a cover part that prevents light from the outside except for light irradiated from the light source unit from inputting to the objective lens.

3. A fluorescent microscope comprising:

an objective lens that forms images of fine objects treated with fluorescent materials on a stage, wherein the objective lens includes a heating line that suppresses and removes moisture generated from the surface of the objective lens;

a light source unit that irradiates to the fine objects;

an image sensor that provides light matching coloring wavelengths of the fluorescent materials passing through the objective lens and converts the provided light into electrical signals;

a display unit that receives the electrical signals from the image sensor and outputs them as images;

a controller that controls a focus and a storing period of the images according to commands input by a user; and a wireless transceiver that wirelessly transmits the images to the outside and wirelessly receives commands input to the controller, wherein the stage, the objective lens, the light source unit, the image sensor, the display unit, the controller, and the wireless transceiver are integrally provided in one body, wherein the heating line is automatically operated under predetermined temperature and predetermined humidity, wherein the heating line is provided between frames of the objective lens along a circumferential direction of the objective lens.

4. The fluorescent microscope according to claim 3, wherein it is remotely controlled by an external controller that wirelessly communicates with the wireless transceiver.

5. The fluorescent microscope according to claim 3, wherein the controller captures the images of the fine objects per a predetermined period set by the user and stores them in a storage device.

6. The fluorescent microscope according to claim 3, further comprising a cover part that prevents light from the outside except for light irradiated from the light source unit from inputting to the objective lens.

* * * * *